United States Patent
Goare et al.

(10) Patent No.: US 11,299,074 B2
(45) Date of Patent: Apr. 12, 2022

(54) BELT LOCK OFF MECHANISM FOR CHILD CAR SEAT

(71) Applicant: Cybex GmbH, Bayreuth (DE)

(72) Inventors: Alexander Douglas Goare, Charlotte, NC (US); Jeffrey Douglas, Colorado Springs, CO (US)

(73) Assignee: Cybex GmbH, Bayreuth (DE)

(*) Notice: Subject to any disclaimer, the term of this patent is extended or adjusted under 35 U.S.C. 154(b) by 0 days.

(21) Appl. No.: 17/003,046

(22) Filed: Aug. 26, 2020

(65) Prior Publication Data

US 2022/0063455 A1   Mar. 3, 2022

(51) Int. Cl.
*B60N 2/28* (2006.01)

(52) U.S. Cl.
CPC ......... *B60N 2/2806* (2013.01); *B60N 2/2821* (2013.01); *B60N 2/2869* (2013.01); *B60N 2002/2815* (2013.01)

(58) Field of Classification Search
CPC .. B60N 2/2806; B60N 2/2821; B60N 2/2869; B60N 2002/2815
See application file for complete search history.

(56) References Cited

U.S. PATENT DOCUMENTS

| | | | |
|---|---|---|---|
| 6,854,415 B2 | 2/2005 | Barnes | |
| 7,163,265 B2* | 1/2007 | Adachi | B60N 2/2806 297/250.1 |
| 7,246,855 B2* | 7/2007 | Langmaid | B60N 2/2806 297/256.13 |
| 7,926,874 B2 | 4/2011 | Hendry | |
| 7,988,230 B2 | 8/2011 | Heisey | |
| 8,262,161 B2 | 9/2012 | Fritz | |
| 8,322,788 B2* | 12/2012 | Williams | B60N 2/2821 297/256.16 |
| 8,573,695 B2 | 11/2013 | Van Geer et al. | |
| 9,365,135 B2 | 6/2016 | Carpenter | |
| 9,592,751 B2* | 3/2017 | Kirstein | B60N 2/2875 |
| 10,189,381 B2* | 1/2019 | Williams | B60N 2/2806 |
| 10,363,842 B2* | 7/2019 | Anderson | B60N 2/286 |
| 10,723,245 B2* | 7/2020 | Anderson | B60N 2/2824 |
| 2005/0184567 A1* | 8/2005 | Carpenter | B60N 2/2875 297/256.16 |
| 2009/0066131 A1* | 3/2009 | Hendry | B60N 2/2821 297/256.16 |
| 2017/0190268 A1 | 7/2017 | Zhao | |

FOREIGN PATENT DOCUMENTS

CN  104527469 A  4/2015

* cited by examiner

*Primary Examiner* — Philip F Gabler
(74) *Attorney, Agent, or Firm* — Shook, Hardy & Bacon, L.L.P.

(57) ABSTRACT

Disclosed herein is a child car seat configured to be installed in an associated vehicle using a safety belt of the associated vehicle. The child car seat is comprised of a shell and a belt lock off mechanism including a first arm movable between (a) an unlocked position in which the first arm is not configured to tension the safety belt of the associated vehicle, and (b) a locked position in which the first arm is configured to tension the safety belt of the associated vehicle. A second arm is configured to engage with and urge the first arm to move from the unlocked position to the locked position so as to tension the safety belt of the associated vehicle.

11 Claims, 6 Drawing Sheets

BELT LOCK OFF MECHANISM FOR CHILD CAR SEAT

TECHNICAL FIELD

The present disclosure relates generally to car seats for use in motor vehicles. More particularly, the present disclosure relates to car seats comprised of a belt lock off mechanism to add tension to a safety belt when the car seat is installed in a vehicle.

BACKGROUND

In the United States, child car seats are required by law and recommended for children of certain ages or sizes. There are many types of car seats available for purchase. Child car seats generally include a plastic shell with a cushioned seat formed over the shell. A safety belt of the vehicle (e.g., a lap belt existing in the vehicle) is generally used to securely install and mount the base of the car seat in the vehicle. In this field, safety is of utmost concern and proper installation is critical to ensure proper performance. Installation of child car seats using an existing safety belt of a vehicle (e.g., a lap belt of the vehicle) can be difficult by requiring substantial force to adequately tension the safety belt, which many users find unnecessarily difficult.

It would be desirable to provide a child car seat with a belt lock off mechanism configured to tension (or aid in tensioning) the safety belt of the vehicle. In particular, it would be desirable to provide a belt lock off mechanism that increases the mechanical advantage in the system by using leverage to assist the user in moving the belt lock off mechanism into a locked (i.e., tensioning) position. More specifically, it would be desirable to design the belt lock off mechanism so as to decrease the amount of force a user must apply in order to close the belt lock off mechanism into the locked and tensioning position, thereby overcoming certain deficiencies present in currently-available devices. Such a belt lock off mechanism would further desirably decrease the potential for improper, unsafe, or otherwise undesirable installation (e.g., installation with insufficient tensioning of the safety belt).

BRIEF SUMMARY

Disclosed herein are car seats configured to be installed in an associated vehicle. As is known in the art, the car seats may be installed in the vehicle using a safety belt of the vehicle (e.g., an existing lap belt of the vehicle). The car seats may be comprised of a seat bucket, a base, and a belt lock off mechanism. The belt lock off mechanism may be designed to tension the safety belt of the vehicle. Tensioning the safety belt may generally ensure proper installation and mounting of the car seat in the vehicle.

The belt lock off mechanism may preferably include a first arm (e.g., a belt engaging arm) designed to directly engage with and tension the safety belt and a second arm (e.g., a leverage arm) designed to engage with the first arm and urge the first arm into a position in which the first arm engages and tensions the safety belt. Alternatively, the belt lock off mechanism could be provided with a single arm designed to directly engage with and tension the safety belt. In certain applications, it is desirable to use the second arm because the second arm may desirably be designed function in closing the first arm (i.e., moving the first arm into a locked position in which the first arm tensions the safety belt). As will be appreciated by those skilled in the art, the second arm may increase the mechanical advantage in the system by using leverage to assist in moving the first arm into the locked position. This advantageously decreases the amount of force a user would otherwise be required to apply directly to the first arm in order to close the first arm in the locked and tensioning position and likewise advantageously decreases the potential for an improper, unsafe, or otherwise undesirable installation.

In accordance with the foregoing, disclosed in exemplary embodiments herein are child car seats. In accordance with particular embodiments of the present disclosure, an exemplary child car seat comprises: a seat bucket supported on a base; and a belt lock off mechanism configured to tension the safety belt of the associated vehicle. The base can include the base include a belt path configured to receive the safety belt of the associated vehicle therealong. The belt lock off mechanism can comprise a first arm pivotally connected to the base on a first side of the belt path. The first arm may be movable into a locked position in which the first arm is configured to tension the safety belt of the associated vehicle. In particular, the first arm may be movable between (a) an unlocked position in which the first arm is not configured to tension the safety belt of the associated vehicle, and (b) a locked position in which the first arm is configured to tension the safety belt of the associated vehicle. In addition to the first arm, the belt lock off mechanism may further comprise a second arm configured to engage with and urge the first arm to into the locked position so as to tension the safety belt of the associated vehicle. In particular, the second arm may be configured to engage with and urge the first arm to move from the unlocked position to the locked position so as to tension the safety belt of the associated vehicle.

In certain constructions, the second arm may be slidably and pivotally connected to the base on a second side of the belt path opposite the first side of the belt path. The second arm may be slidable into and out of the base between a storage position and an engagement position, respectively. The second arm may be slidable into and out of the base in a direction substantially perpendicular to the belt path. The belt path may have a longitudinal axis extending therealong. The belt path may be defined between the first and second arms. The first and second arms may each be pivotable substantially perpendicularly to the longitudinal axis of the belt path. The car seat may include an interlock configured such that when the first arm is in the locked position (i.e., when the first arm is tensioning the safety belt), the second arm is released (i.e., has free motion) and is capable of sliding back into the base.

In accordance with embodiments of the disclosure, the first arm can include at least one engagement feature. The second arm may include at least one receiving feature. The receiving feature of the second arm may be shaped complementary to the engagement feature of the first arm. The receiving feature of the second may be configured to engage the engagement feature of the first arm and urge the first arm to move into the locked position so as to tension the safety belt. The engagement feature of the first arm may, in certain constructions, include a plurality of nubs projecting outwardly from opposing sides of the first arm. The receiving feature of the second arm may, in certain constructions, include a plurality of jutting portions. The jutting portions may project outwardly from a lower face of the second arm. Each of the jutting arms may define a receiving surface configured to receive a corresponding one of the engagement features (e.g., the nubs) of the first arm.

In accordance with particular embodiments of the present disclosure, the car seat may be configured as a rotatable car seat. In particular, the seat buck may be rotatable relative to the base. In embodiments in which the car seat is rotatable, the base of the car seat may generally remain stationary when installed in an associated vehicle and only the seat bucket may be configured to rotate relative to the base. The belt lock off mechanism (or at least a portion or certain components thereof) may be curved so as to be fully operate with a rotatable car seat of the present disclosure.

In certain constructions, the first arm may include an actuator. The actuator of the first arm may be configured to cause the first arm to transition from the locked position to the unlocked position so as to remove tension from the safety belt. The actuator may, in particular embodiments, be a spring-actuated button. The spring-actuated button may be configured to bias the first arm (e.g, cause the first arm to remain) in the locked position until actuation (e.g., by sliding to overcome the spring biasing force) of the spring-actuated button. The actuator may be configured such that when the first arm is closed, the first arm automatically locks into the locked position and cannot be transitioned back into the unlocked position without actuating the actuator (e.g., by sliding the actuator).

In accordance with embodiments of the disclosure, the base may include a recessed portion. The recessed portion may be defined between the first and second arms. In particular, the portion of the belt path between the first and second arms may define the recessed portion. At least a portion of the safety belt may be received within the recessed portion when the first arm is in the locked position. At least a portion of the first arm may also be received within the recessed portion when the first arm is in the locked position. When the first arm is moved into the locked position and tensions the safety belt, the safety belt may be pressed into the recessed portion.

In accordance with particular embodiments of the present disclosure, the first arm may include opposing upper and lower faces. The second arm may also include opposing upper and lower faces. When the first arm is in the locked position, the lower face of the first arm my be positioned contiguously with the safety belt. When the first arm is in the locked position, the lower face of the second arm may be positioned contiguously with the upper face of the first arm. When the first arm is in the locked position, the safety belt, the first arm, and the second arm may each be positioned within the recessed portion. A cover may, in certain embodiments, be provided that is configured to close the recessed portion and define a relatively smooth surface of the base.

In accordance with other particular embodiments of the present disclosure, a method of tensioning a safety belt of used for installing a child car seat in an associated vehicle including the car seat comprises: receiving the safety belt; and operating a belt lock off mechanism to tension the safety belt. The safety belt may be received along a belt path of a base of the child car seat to install the child car seat in the associated vehicle. Operating the belt lock off mechanism to tension the safety belt may include positioning a first arm into an unlocked position in which the first arm does not tension the safety belt of the associated vehicle. The first arm may be pivotably connected to the base on a first side of the belt path. Operating the belt lock off mechanism to tension the safety belt may further include moving a second arm to engage the first arm and urge the first arm to move into a locked position so as to tension the safety belt.

In accordance with embodiments of the disclosure, the method may further include transitioning the first arm from the locked position to the unlocked position so as to remove tension from the safety belt. Transitioning the first arm from the locked position back into the unlocked position may be accomplished by operating an actuator of the first arm.

In accordance with particular embodiments of the present disclosure, operating the belt lock off mechanism to tension the safety belt may include engaging an engagement feature of the first arm with a receiving feature of the second arm to urge the first arm to move into the locked position so as to tension the safety belt.

In accordance with embodiments of the disclosure, the second arm may be slid out of the base. The second arm may then be pivoted relative to the base into an engagement position in which the second arm can engage with the first arm. The second arm may then be moved to urge the first arm to move into the locked position so as to tension the safety belt. The second arm may then be slid back into the base into a storage position.

In accordance with other particular embodiments of the present disclosure, a belt lock off mechanism configured to tension a safety belt of an associated vehicle comprises: a first arm pivotally movable into a locked position in which the first arm is configured to tension the safety belt of the associated vehicle; and a second arm configured to engage with and urge the first arm to move into the locked position so as to tension the safety belt of the associated vehicle, wherein a belt path is defined between the first and second arms, the belt path configured to receive the safety belt of the associated vehicle therealong.

Other aspects of the invention may be apparent to those of ordinary skill with review of the attached drawings, appended claims, and additional description.

BRIEF DESCRIPTION OF THE DRAWINGS

The foregoing and other features of the present disclosure will become more fully apparent from the following description and appended claims, taken in conjunction with the accompanying drawings. Understanding that these drawings depict several examples in accordance with the disclosure and are, therefore, not to be considered limiting of its scope, the disclosure is described with additional specificity and detail below through the use of the accompanying drawings.

DETAILED DESCRIPTION

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and illustrated in the drawings, may be arranged, substituted, combined, and designed in a wide variety of different configurations, each of which are explicitly contemplated and form a part of this disclosure.

It should be noted that some of the terms used herein may be relative terms. For example, the terms "upper" and "lower" are relative to each other in location, i.e. an upper component is located at a higher elevation than a lower component in a given orientation, but these terms may change if the device is flipped. An intermediate component, on the other hand, is always located between an upper component and a lower component regardless of orientation. The terms "horizontal" and "vertical" are used to indicate direction relative to an absolute reference, i.e. ground level. However, these terms should not be construed to require structures to be absolutely parallel or absolutely perpendicular to each other. For example, a first vertical structure and a second vertical structure are not necessarily parallel to each other. The terms "top" and "bottom" or "base" are used to refer to surfaces where the top is always higher than the bottom/base relative to an absolute reference, i.e. the surface of the earth. The terms "upwards" or "upwardly" and "downwards" or "downwardly" are also relative to an absolute reference; upwards is always against the gravity of the earth. The term "parallel" should be construed in its lay sense of two surfaces that maintain a generally constant distance between them, and not in the strict mathematical sense that such surfaces will never intersect when extended to infinity. The terms "operative to" and "adapted to" and similar terms are used herein to describe that a particular component has certain structural features designed to perform a designated function. Such components should be construed as having the expressed structure, with the designated function being considered part of the structure.

Figure 6:
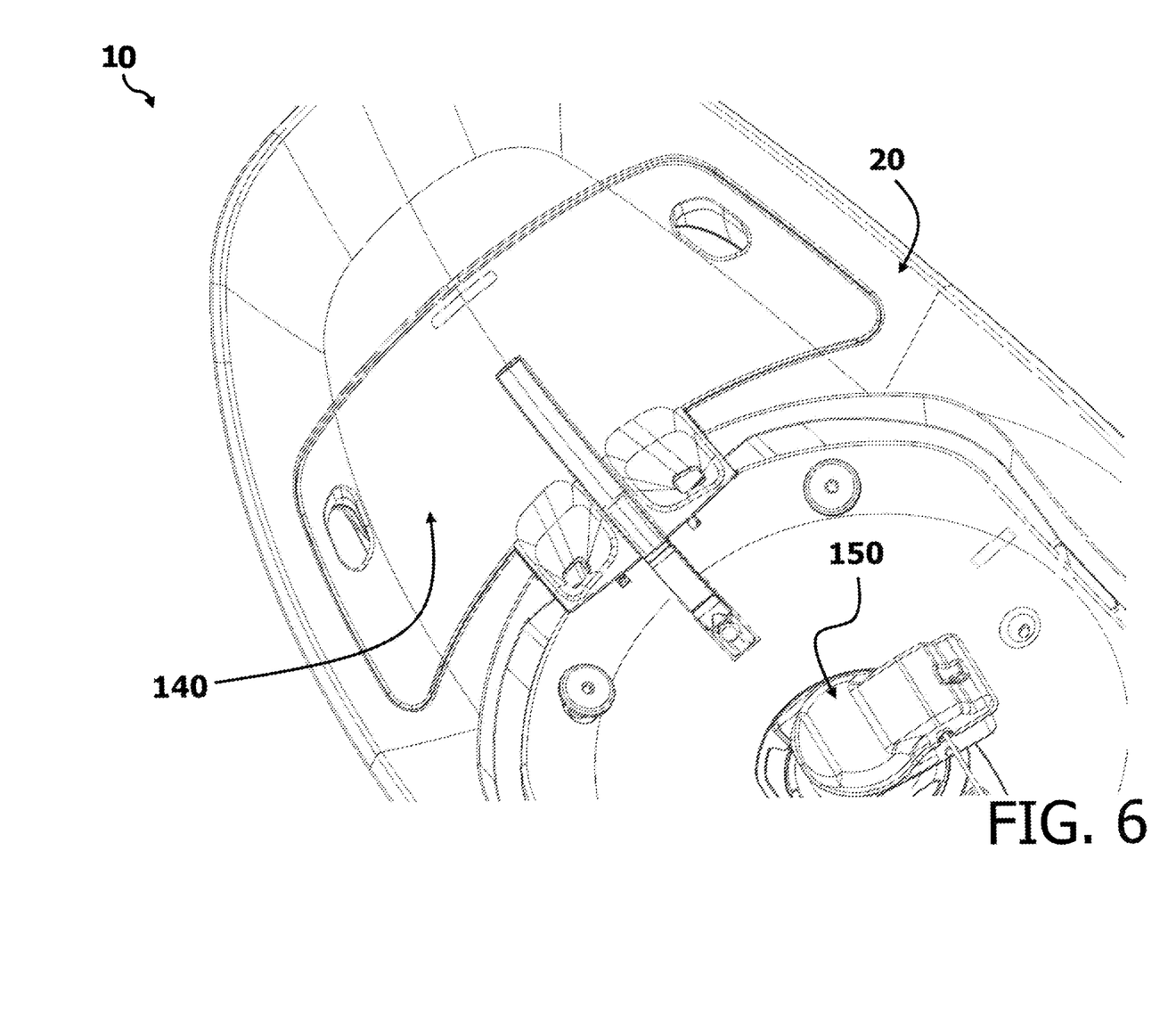
FIG. 6 is a perspective view of a portion of a base of the child car seat of FIG. 1 with a cover closed over the belt lock off mechanism to define a relatively smooth surface of the base.

In accordance with aspects of the disclosure, exemplary embodiments of child car seats are illustrated in various levels of specificity in FIGS. 1-6. Very generally, car seat 10 is designed for safely transporting an infant or child in a car. Child car seat 10 may include a seat bucket (not shown), which may, in certain embodiments, be supported on a base 20. With reference to FIG. 6, the seat bucket may, in particular embodiments, be supported on an attachment mechanism 150. The attachment mechanism 150 may be configured to allow the seat bucket to be rotate relative to the base 20. As will be readily understood by those skilled in the art, the car seat 10 (and, more particularly, the base 20 thereof) may be affixed to the seat of a car, such as by an existing safety belt of the car. The base 20 may include a belt path 26. The belt path 26 may be configured to receive the safety belt therealong (e.g., along a length of the base). The belt path 26 may generally extend across the base 20.

A belt lock off mechanism 100 may be incorporated into an aspect of the car seat 10 (see, e.g. FIGS. 1-5), thereby providing an easy-to-use mechanism for tensioning the safety belt of the vehicle when installing and mounting the base 20. The belt lock off mechanism 100 may be operatively connected to the base 20. In particular, the belt lock off mechanism 100 may be mounted for pivoting and/or sliding movement relative to the base 20.

In embodiments, the belt lock off mechanism 100 may include a first arm 110. The first arm 110 may include an upper face 112 and an opposing lower face 114. The first arm 110 may also include opposing sides 116, 118. The opposing sides 116, 118 of the first arm 110 may extend between and connect the upper face 112 and the lower face 114 of the first arm 110.

The first arm 110 can be connected to the base 20. A proximal end of the first arm 110 can be connected to the base 20 on a first side 28 of the belt path 26. A distal end of the first arm 110 may be spaced apart from the proximal end of the first arm 110. The first arm 110 may be pivotally movable with respect to the base 20 such that the distal end of the first arm 110 is capable of moving toward and away from the base 20 (and, more particularly, toward and away from the belt path 26).

In embodiments, in addition to the first arm 110, the belt lock off mechanism 100 may include a second arm 120. The first arm 110 may include an upper face 122 and an opposing lower face 124. The second arm 110 may also include opposing sides 126, 128. The opposing sides 126, 128 of the second arm 120 may extend between and connect the upper face 122 and the lower face 124 of the second arm 120.

The second arm 120 can be connected to the base 20. A proximal end of the second arm 120 can be connected to the base 20 on a second side 29 of the belt path 26 opposite the first side 28 of the belt path 26. A distal end of the second arm 120 may be spaced apart from the proximal end of the second arm 120. The second arm 120 may be pivotally movable with respect to the base 20 such that the distal end of the second arm 120 is capable of moving toward and away from the base 20 (and, more particularly, toward and away from the belt path 26). The second arm 120 may also be slidably movable with respect to the base 20 such that the second arm 120 is slidable into and out of the base 20. The second arm 120 may be slidable into and out of the base 20 in a direction substantially perpendicular to the belt path 26.

Figure 1:
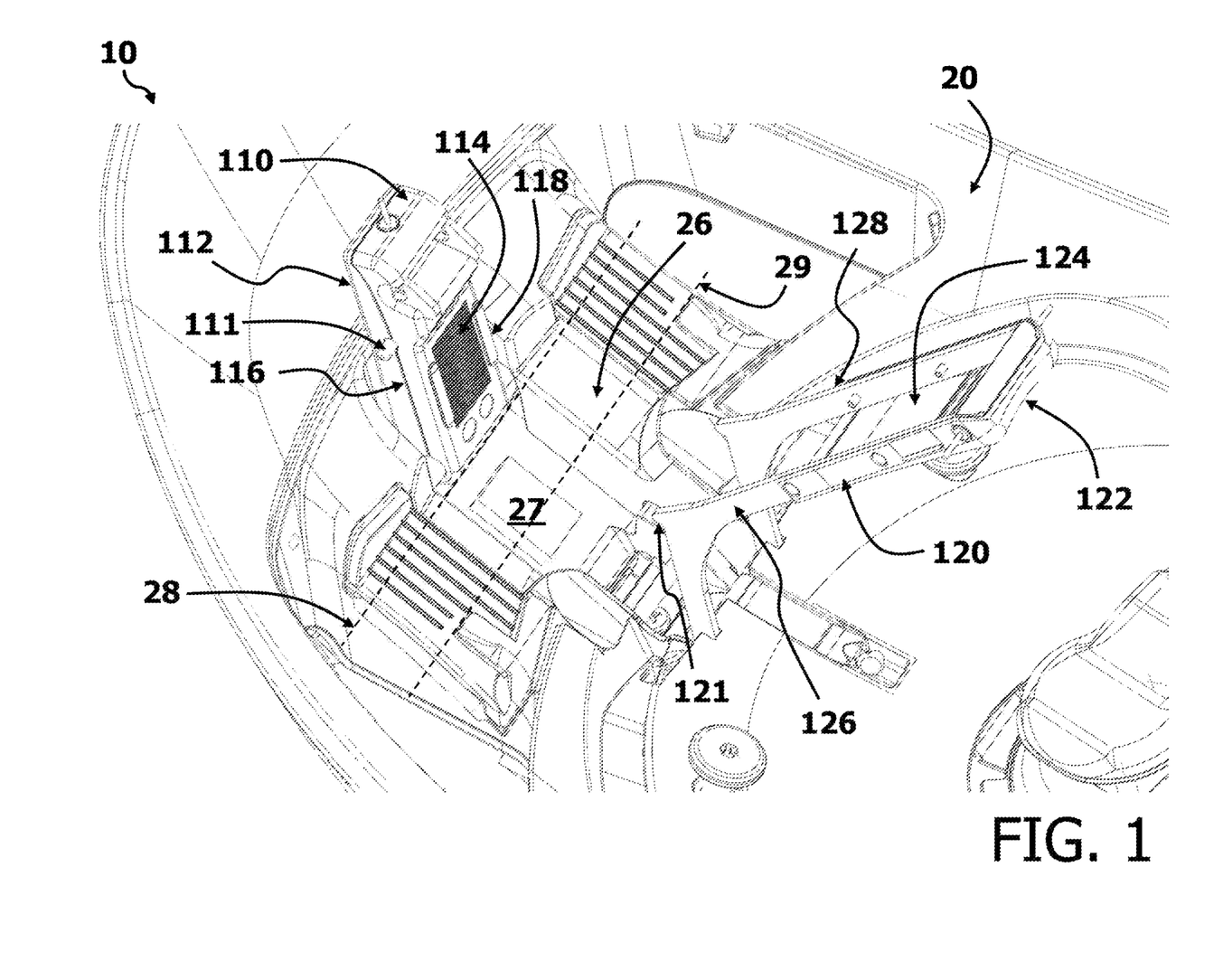
FIG. 1 is a perspective view of a portion of base of a child car seat incorporating a belt lock off mechanism having a first arm in an unlocked position and a second arm slid out from the base to an upright position in accordance with the disclosure.
Figure 2:
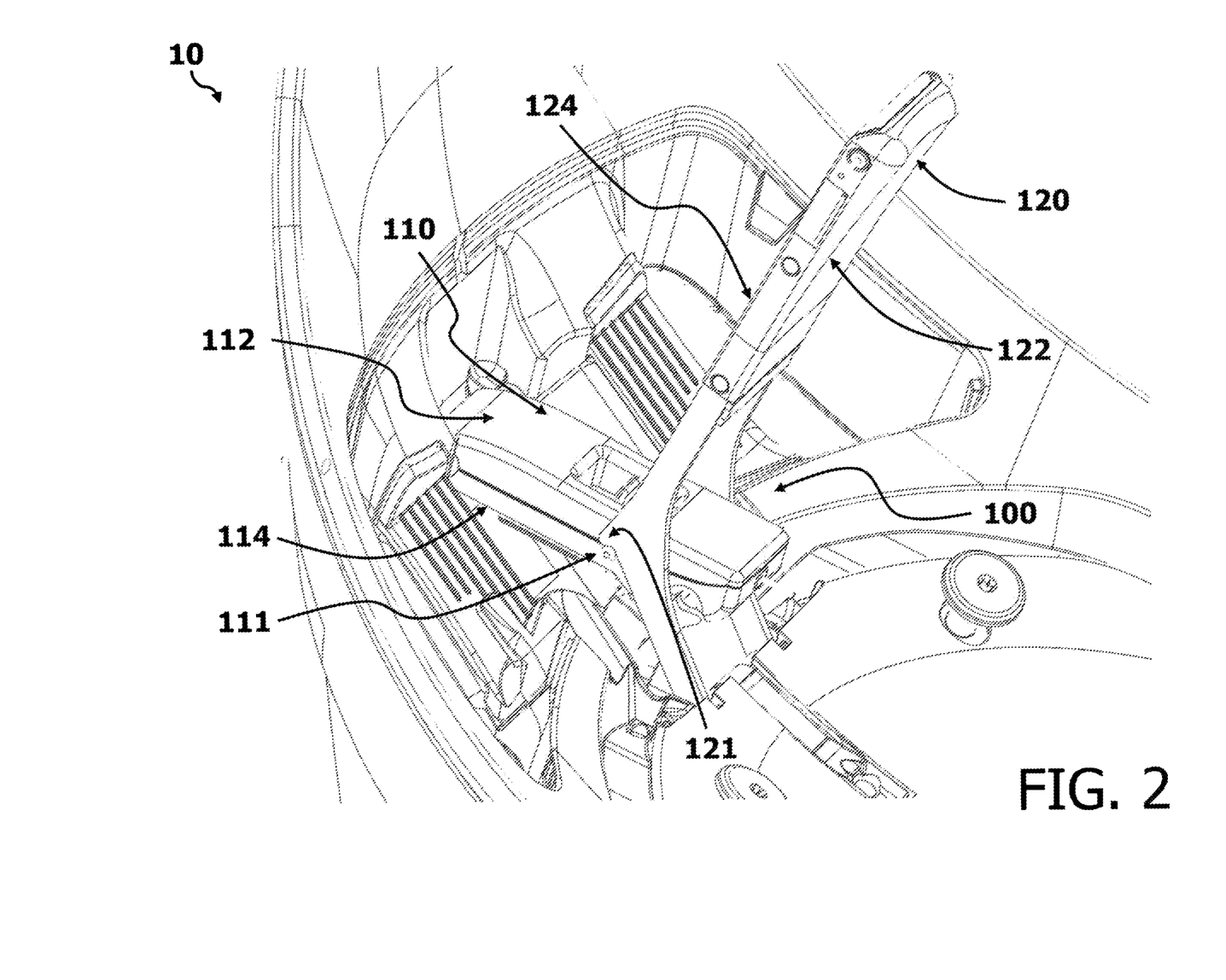
FIG. 2 is a perspective view of a portion of a base of the child car seat of FIG. 1 with the second arm of the belt lock mechanism pivoted toward the base into an engagement position in which the second arm can engage with the first arm of the belt lock mechanism.

The first arm 110 may be movable between an unlocked position and a locked position. FIG. 1 and FIG. 2 illustrate the first arm 110 in the unlocked position. In FIG. 1, the first arm 110 is positioned in an upright unlocked position in which the first arm 110 is not configured to be engaged by the second arm 120. In FIG. 2, on the other hand, the first arm 110 is positioned in a lowered unlocked position (e.g., by pivoting the first arm 110 toward the base 20, and, more particularly, toward the belt path 26) in which the first arm 110 is configured to be engaged by the second arm 120.

In the unlocked position, the first arm 110 is generally positioned such that the first arm 110 is not configured to tension the safety belt. In particular, in the unlocked position, the first arm 110 is generally positioned such that the first arm 110 does not contact the safety belt. More specifically, in the unlocked position, the first arm 110 is generally positioned such that the lower face 114 of the first arm 110 is not positioned proximate the belt path 26. Even more specifically, in the unlocked position, the first arm 110 is generally positioned such that the lower face 114 of the first arm 110 is not positioned contiguously with the safety belt.

Figure 3:
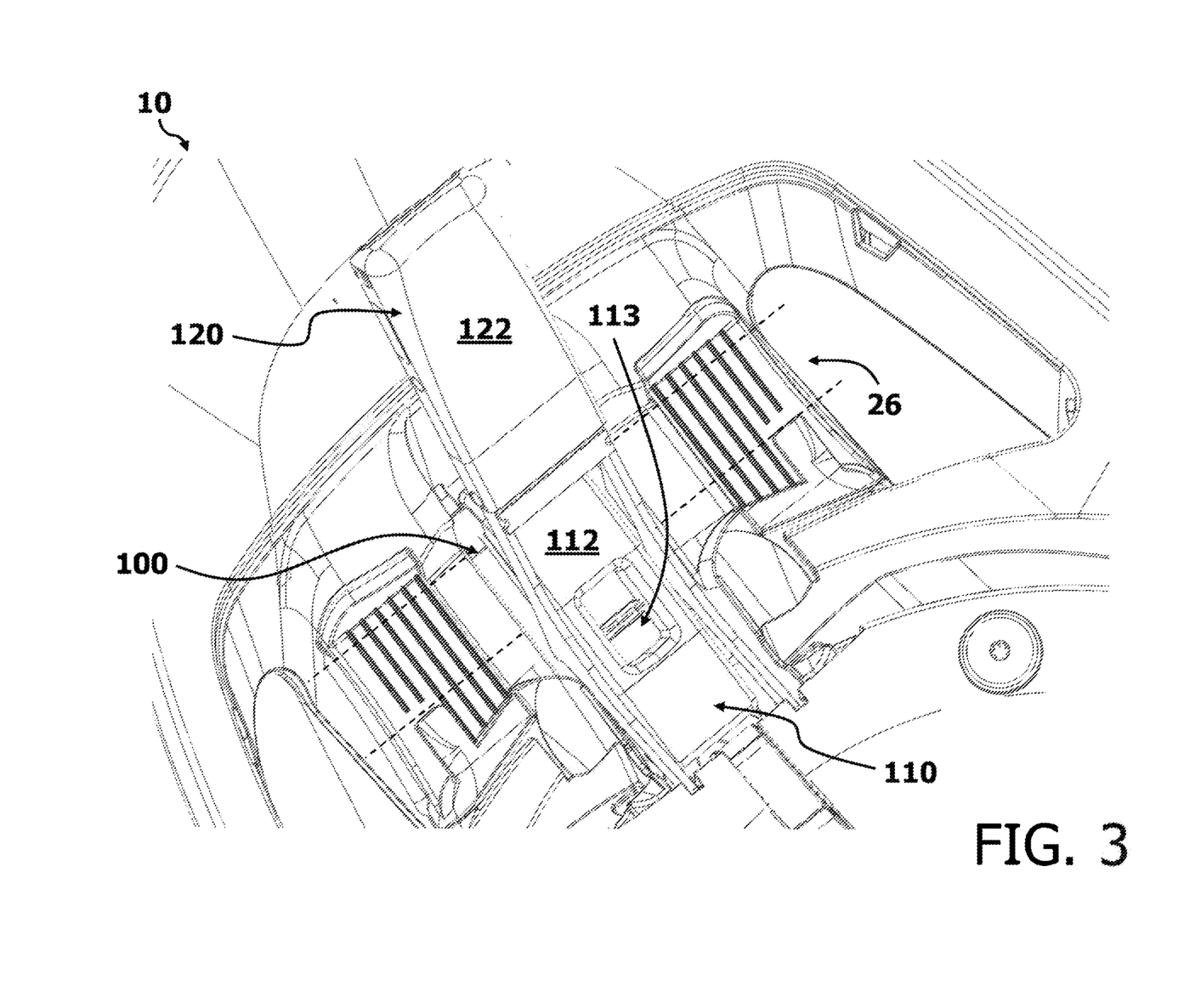
FIG. 3 is a perspective view of a portion of a base of the child car seat of FIG. 1 with the second arm of the belt lock off mechanism having engaged and urged the first arm of the belt lock mechanism into a locked position.
Figure 4:
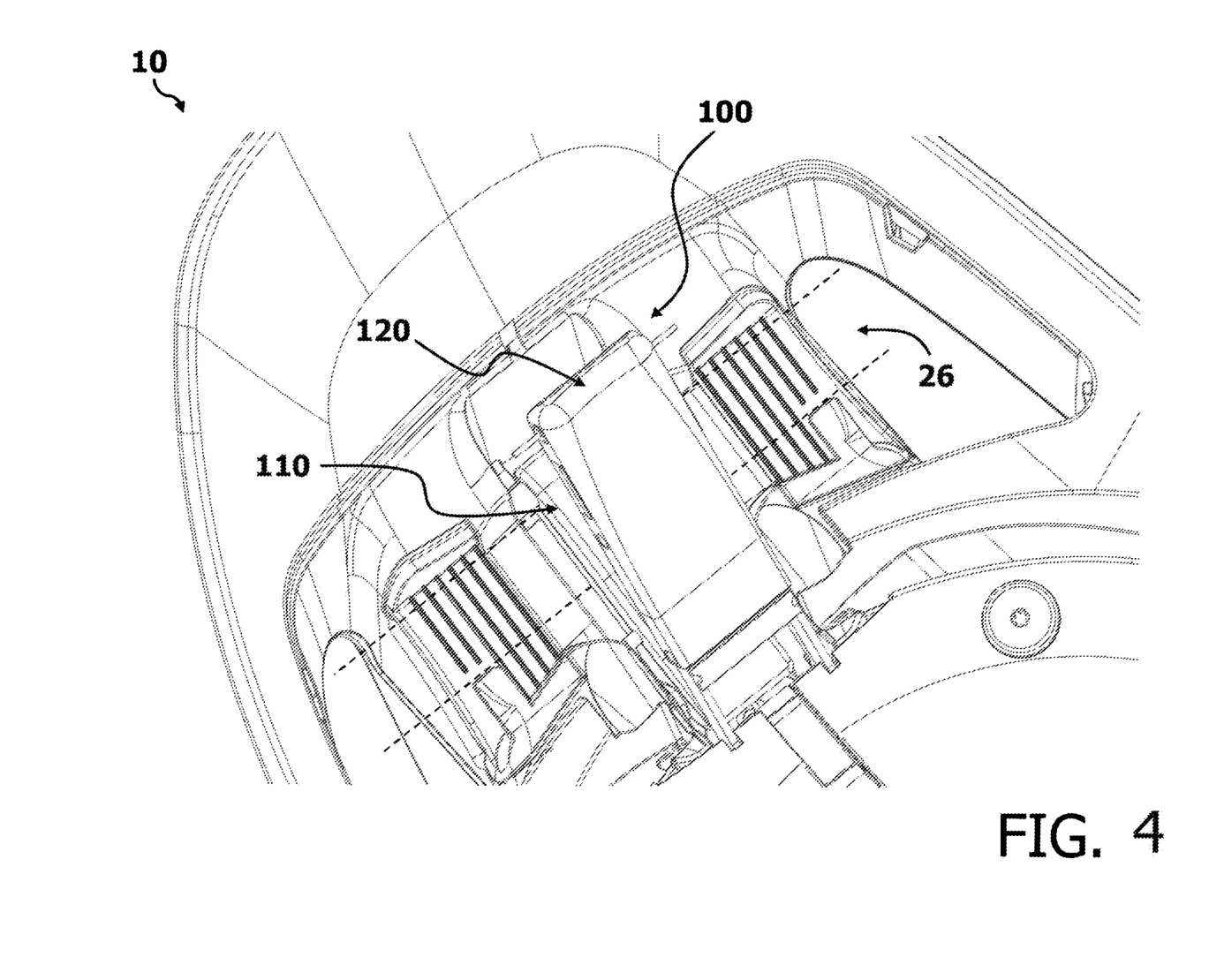
FIG. 4 is a perspective view of a portion of a base of the child car seat of FIG. 1 with the second arm moving toward a storage position by sliding into the base with the first arm of the belt lock mechanism in the locked position.
Figure 5:
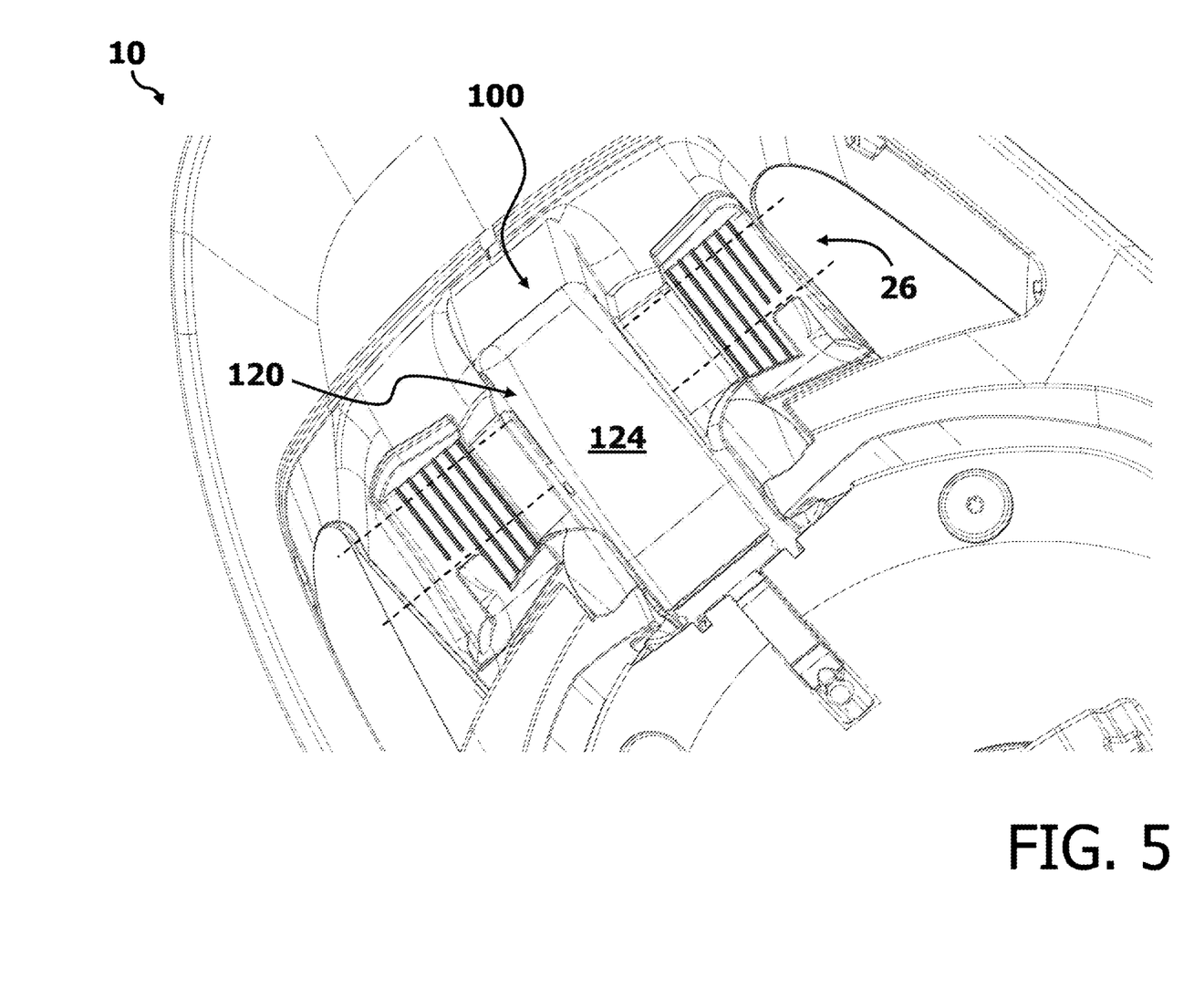
FIG. 5 is a perspective view of a portion of a base of the child car seat of FIG. 1 with the second arm in the storage position and fully slid into the base with the first arm of the belt lock mechanism in the locked position.

FIG. 3 and FIG. 4 illustrate the first arm 110 in the locked position. In the locked position, the first arm 110 is generally positioned such that the first arm 110 is configured to tension the safety belt. In particular, in the locked position, the first arm 110 is generally positioned such that the first arm 110 contacts the safety belt. More specifically, in the locked position, the first arm 110 is generally positioned such that the lower face 114 of the first arm 110 is positioned proximate the belt path 26. Even more specifically, in the locked position, the first arm 110 is generally positioned such that the lower face 114 of the first arm 110 is positioned contiguously with the safety belt.

In certain embodiments, an interlock (not shown) may be configured such that when the first arm 110 is in the locked position (refer to FIG. 3 and FIG. 4), the second arm 120 is released and capable of sliding into the base 20. Put another way, the second arm 120 may be configured to have free range of motion when the first arm 110 is in the unlocked position. For example, the second arm 120 may include positioning elements (e.g., detent features) that retain the second arm 120 in the engaging position (see, e.g., FIG. 1). Generally, the second arm 120 may be configured to allow a user to push or move the second arm 120 out of the engaging position at any time without breaking the system. A retaining system or element (e.g., a spring) may be employed to generally maintain the second arm 120 in an upright and/or engagement position, thereby increasing the ease with which the user can install the car seat and properly tension the safety harness belt.

The belt path 26 may generally be defined between the first arm 110 and the second arm 120. In some embodiments, a recessed portion 27 of the base 20 may be defined between the first arm 110 and the second arm 120 may defined a recessed. The recessed portion 27 may be configured to receive at least a portion of the safety belt when the first arm 110 is in the locked position. In such embodiments, the safety belt may be tensioned by the first arm 110 and a portion of the safety belt may be pressed into the recessed portion 27 of the base 20. The recessed portion 27 may also be configured to receive at least a portion of the first arm 110 when the first arm 110 is in the locked position.

As briefly described above, in FIG. 2, the first arm 110 is positioned in a lowered unlocked position (e.g., by pivoting the first arm 110 toward the base 20, and, more particularly, toward the belt path 26) in which the first arm 110 is configured to be engaged by the second arm 120. The first arm 110 may include one or more engagement features 111 (refer to FIG. 1 and FIG. 2). The second arm 120 may include one or more receiving features 121 (refer to FIG. 1 and FIG. 2). The receiving feature(s) 121 of the second arm 120 may be configured to engage the engagement feature(s) 111 of the first arm 110 and urge the first arm 110 to move toward the base 20 and, more particularly, toward the belt path 26 (e.g., and into the locked position so as to tension the safety belt). In particular, when the second arm 120 is pivoted relative to the base 20 into the engagement position, the receiving feature(s) 121 of the second arm 120 can engage the engagement feature(s) 111 of the first arm 110. In embodiments, the receiving feature(s) 121 of the second arm 120 may be shaped complimentary to the engagement feature(s) 111 of the first arm 110. In the embodiment illustrated in FIG. 1 and FIG. 2, the first arm 110 includes a pair of engagement features 111 (only one of which is labeled for clarity) in the form of nubs spaced apart from one another and projecting outwardly from corresponding ones of the opposing sides 116, 118 of the first arm 110. In the embodiment illustrated in FIG. 1 and FIG. 2, the second arm 120 includes a pair of receiving features 121 (only one of which is labeled for clarity) in the form of jutting portions spaced apart from one another and defining receiving surfaces configured to receiving corresponding ones of the engagement features 111 (e.g., the nubs) of the first arm 110. Although specific engagement features and receiving features are illustrated, as will be appreciated by those skilled in the art, other engagement features and other receiving features could be employed to assist in receiving or spreading out at least a portion of the force to support closing the attachment mechanism. For purposes of example only, it is contemplated that the engagement feature of the first arm could be a center rod or other structure that is shaped complementary to and interfaces with the receiving feature of the second arm.

With reference now to FIG. 3, the first arm 110 may include an actuator 113. The actuator 113 may be positioned on the first face 112 of the first arm 110 so that a user may operate the actuator when the first arm 110 is in the locked position (e.g., as shown in FIG. 3). The actuator 113 may be positioned between the proximal and distal ends of the first arm 110. The actuator 113 may be configured to cause the first arm 110 to transition from the locked position to the unlocked position so as to remove tension from the safety belt. In this regard, when the first arm 110 is in the locked position (and the safety belt is tensioned), actuation of the actuator 113 may cause the first arm 110 to transition to the unlocked position, thereby removing tension from the safety belt. The actuator 113 may, in certain embodiments, be a spring-actuated button. The spring-actuated button may be configured to cause the first arm 110 to remain in the locked position until actuation of the spring-actuated button. More particularly, when the first arm 110 is in the locked position, the spring-actuated button may bias and retain the first arm 110 in the locked position. In this regard, when the first arm 110 is in the locked position (and the safety belt is tensioned), actuation of the spring-actuated button to overcome the bias may cause the first arm 110 to transition to the unlocked position, thereby removing tension from the safety belt.

As will now be appreciated, employing the belt lock off mechanism described herein (e.g., belt lock mechanism 100 illustrated in FIGS. 1-5), a car seat (e.g., car seat 10 illustrated in FIGS. 2-5) may be installed and mounted in a vehicle using a safety belt (e.g., an existing safety belt of the vehicle). In particular, the safety belt of the vehicle may be received along the belt path 26 of the base 20 of the car seat 10 to install the car seat 10 in the vehicle. The safety belt may then be properly tensioned by operating the belt lock mechanism 100 to tension the safety belt by (a) positioning the first arm 110 into an unlocked position (e.g., the lowered unlocked position illustrated in FIG. 2) in which the first arm 110 is configured to be engaged by the second arm 120) (e.g., by pivoting the first arm 110 toward the base 20, and, more particularly, toward the belt path 26), and (b) moving the second arm 120 to engage the first arm 110 and urge the first arm 110 to move into the locked position so as to tension the safety belt. More specifically, the first arm 110 may be pivoted relative to the base from the upright unlocked position (refer to FIG. 1) to the lowered unlocked position (refer to FIG. 2). Even more specifically, the second arm 120 may be slid out of the base 20 (refer to FIG. 1), the second arm 120 may then be pivoted relative to the base 20 into the engagement position in which the second arm 120 can engage with the first arm 110 (refer to FIG. 2), the second arm 120 may then be moved to urge the first arm 110 to move into the locked position so as to tension the safety belt (refer to FIG. 3), and the second arm 120 may then be slid back into the base 20 into a storage position (refer to FIG. 4 and FIG. 5). Finally, a cover 140 hingedly connected to the base 20 may be closed over the belt lock off mechanism to define a relatively smooth surface of the base 20.

While particular exemplary embodiments have been described, it is not intended that the claims be limited thereto, as it is intended that the claims be as broad in scope as the art will allow and that the specification be read likewise. That is, the foregoing description of specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It will be appreciated by those of ordinary skill in the art that the components, method steps and materials illustrated above may be varied by substitution of equivalent components, steps and materials capable of performing the same functions. It will also be appreciated by one of ordinary skill in the art that sizes and strengths of the components may be scaled up or down as required for specific purposes. The claims hereof are intended to encompass all such equivalent components, method steps and scales.

What is claimed is:

1. A child car seat configured to be installed in an associated vehicle using a safety belt of the associated vehicle, the child car seat comprising:
   a seat bucket supported on a base, the base including a belt path configured to receive the safety belt of the associated vehicle therealong to affix the base to a seat of the associated vehicle; and
   a belt lock off mechanism configured to tension the safety belt of the associated vehicle, the belt lock off mechanism comprising:
      a first arm pivotally connected to the base on a first side of the belt path, the first arm movable into a locked position in which the first arm is configured to tension the safety belt of the associated vehicle; and
      a second arm pivotally connected to the base on a second side of the belt path opposite the first side thereof and slidable into and out of the base in a direction substantially perpendicular to the belt path, the second arm configured to engage with and urge the first arm to move into the locked position so as to tension the safety belt of the associated vehicle.

2. The child car seat of claim 1, further comprising an interlock configured such that when the first arm is in the locked position, the second arm is released and capable of sliding into the base while the first arm remains in the locked position.

3. The child car seat of claim 1, wherein the first arm includes at least one engagement feature and the second arm includes at least one receiving feature configured to engage the at least one engagement feature of the first arm and urge the first arm to move into the locked position so as to tension the safety belt of the associated vehicle.

4. The child car seat of claim 3, wherein the at least one engagement feature of the first arm is a plurality of nubs projecting outwardly from opposing sides of the first arm.

5. The child car seat of claim 4, wherein the at least one receiving feature of the second arm is a plurality of jutting portions, each of the plurality of jutting portions defining a receiving surface configured to receive a corresponding one of the plurality of nubs of the first arm.

6. The car seat of claim 1, wherein the seat bucket is configured to rotate relative to the base.

7. The child car seat of claim 1, wherein the first arm includes an actuator configured to cause the first arm to transition from the locked position to an unlocked position so as to remove tension from the safety belt of the associated vehicle.

8. The child car seat of claim 7, wherein the actuator is a spring-actuated button configured to cause the first arm to remain in the locked position until actuation of the spring-actuated button.

9. The child car seat of claim 1, wherein the portion of the belt path between the first and second arms defines a recessed portion of the base, the recessed portion configured to receive at least a portion of the safety belt of the associated vehicle and at least a portion of the first arm when the first arm is in the locked position.

10. The child car seat of claim 1, wherein the first arm includes opposing upper and lower faces, the lower face of the first arm positioned contiguously with the safety belt of the associated vehicle when the first arm is in the locked position.

11. The child car seat of claim 10, wherein the second arm includes opposing upper and lower faces, the lower face of the second arm positioned contiguously with the upper face of the first arm when the first arm is in the locked position.

* * * * *